Feb. 4, 1964 J. H. STEWART 3,120,579

TELEPHONE ALARM REPORTING SYSTEM

Filed May 28, 1962 2 Sheets-Sheet 1

INVENTOR
J. H. STEWART
BY F. A. McCorkendale
ATTORNEY

INVENTOR
J. H. STEWART
BY J. R. McCorkendale
ATTORNEY

United States Patent Office 3,120,579

Patented Feb. 4, 1964

3,120,579

TELEPHONE ALARM REPORTING SYSTEM

John H. Stewart, Overland, Mo., assignor to Bell Telephone Laboratories, Incorporated, New York, N.Y., a corporation of New York Filed May 28, 1962, Ser. No. 198,241
11 Claims. (Cl. 179—2)

Figure 1:
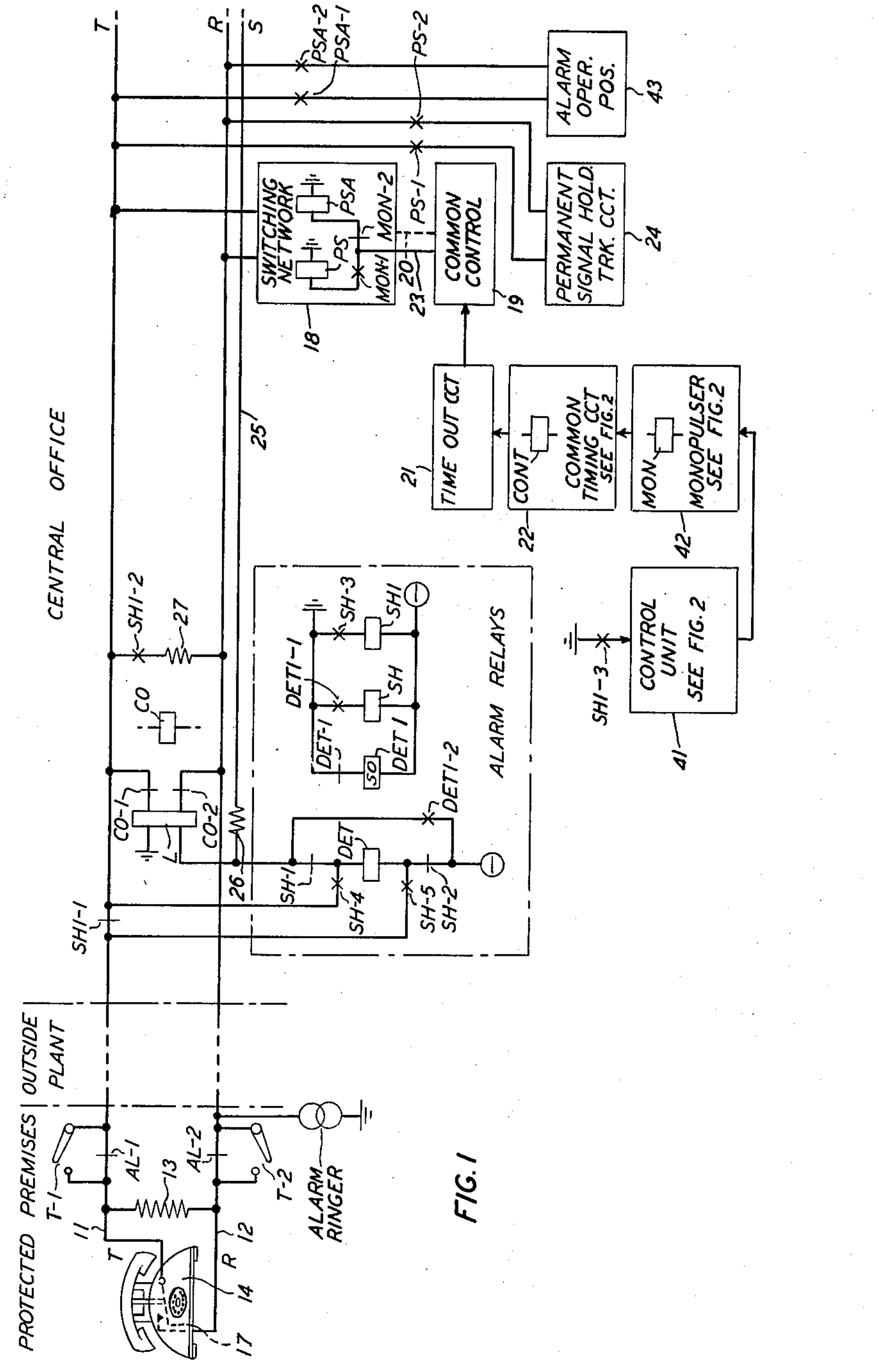

This invention relates to a telephone system and more particularly to a telephone system including emergency alarm reporting facilities.

The protection of premises from damage due to fire and the like, as well as from illegal entry is, of course, a major problem to industry, and many different kinds of alarm networks between protected premises and alarm centers are in regular use for the detection and transmission of alarm indications.

The obvious advantages residing in the use of the vast present-day telephone networks for the transmission of emergency alarm indications between the subscribers' premises and the central offices have been recognized, and many different specific arrangements along this line have been proposed. However, for one reason or another, many of these proposed arrangements have proven unsatisfactory. For example, it is, of course, of paramount importance that the reliability and efficiency of the telephone system in the performance of its normal functions not be disturbed by the addition of the alarm reporting facilities. Also, the efficiency and reliability of the alarm reporting facilities themselves must be at least as good as in the instance of networks restricted to the reporting of alarms alone. Many of the proposed arrangements have failed to satisfactorily meet either or both of the above requirements.

Accordingly, it is an object of my invention to improve the operation of telephone systems provided with emergency alarm reporting facilities.

A more specific object of the invention is to detect alarm indications at a protected location and to transmit such indications to a central office with a minimum of interference with the normal telephone facilities.

A still further specific object of the invention is to distinguish between alarm indications and other types of station permanent signals and to handle the alarm indications within a reduced time interval as compared with the interval prevailing in the instance of the other types of permanent signals.

In accordance with a specific embodiment of the invention, a high resistance bridge is maintained across the tip and ring of the line at the protected premises and a "detect" relay at the central office is normally held operated over a path which includes the two windings of the line relay and the high resistance bridge as series elements. The line relay does not operate over this path due to the high resistance of the bridge. Occurrence of an alarm condition interrupts this path and the detect relay releases and triggers certain sequential operations, including the temporary reduction of the permanent signal interval for the entire office, substitution of a special routing relay for the permanent signal routing relay, and establishment of a low resistance bridge across the tip and ring of the line. The line relay now operates over this lower resistance path causing the "call" to be treated as a permanent signal. In view of the above referred to operations following release of the detect relay, however, the call is processed on the shortened permanent signal interval and is routed to a special alarm operator's position instead of to a permanent signal holding trunk circuit. It is important to note that while, in accordance with the novel arrangement contemplated by the invention, the line relay operates on alarm indications whereby to obtain "recognition of the call," this operation is not permitted until the alarm relays have operated thereby changing the waiting interval and the routing.

Ordinary calls and legitimate permanent signals (receiver off-hook) are handled in the normal manner, unaffected by the alarm detecting arrangement, since in these instances the line is closed at the telephone set through the normal low resistance switchhook loop.

A feature of the invention is a detect relay which is held operated in the absence of an alarm condition over a path which includes a high resistance shunt across the line at the protected premises.

A further feature of the invention is means effective upon occurrence of an alarm condition for temporarily reducing the normal permanent signal interval of the central office.

A still further feature of the invention is means effective during the reduced permanent signal interval for routing call indications to a special alarm operator's position.

Yet another feature of the invention is the use of a monopulser for determining the duration of the reduced permanent signal interval.

It is still another feature of the invention that the alarm detection equipment is automatically returned to normal immediately upon the removal of the alarm indication at the customer's premises.

Figure 2:
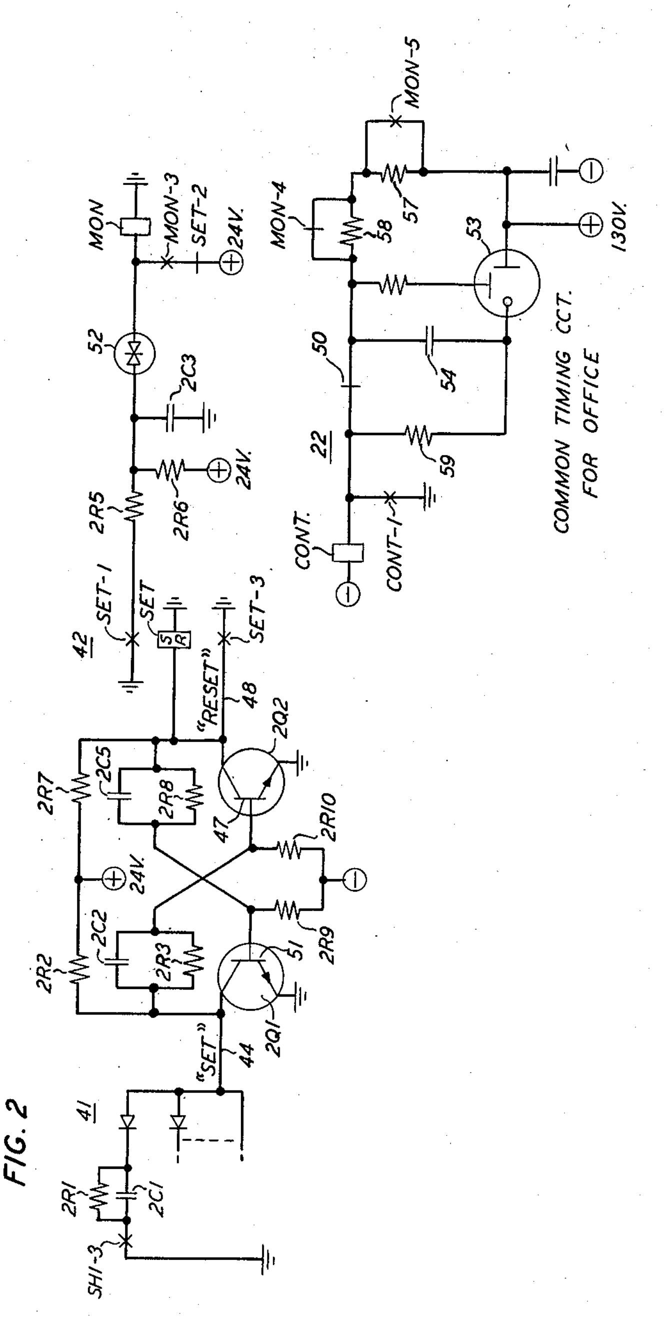

A full understanding of the arrangement contemplated by the present invention as well as an appreciation of the various features thereof may be gained from consideration of the following detailed description in connection with the accompanying drawings, in which:

FIG. 1 shows schematically a portion of an automatic telephone system including one specific illustrative embodiment of the present invention, only those elements of the system being shown or indicated which are actively involved in the functioning of the circuits contemplated by the invention; and FIG. 2 show in greater detail the control unit, the monopulser and the common timing circuit shown schematically in FIG. 1.

Referring now to the drawing, and first particularly to FIG. 1, there is shown bridged across the line (tip 11 and ring 12), a resistor 13 of relatively high value, for example of the order of 40,000ω. Alarm contacts AL–1 and AL–2 are also provided at the protected premises, contact AL–1 being in series with tip 11 and contact AL–2 in series with ring 12. These contacts may be any one of many well-known types whereby a normally closed path is interrupted by operation of the contact upon occurrence of an alarm condition. For example, in the instance of a fire protection system the alarm contact might embody an element fusible by excessive heat, while in the event of a burglar alarm system the switch might be operatively associated with a door or window.

The usual substation set 14 is also provided at the protected premises, the line loop being closed through the set by operation of the switchhook 17 when the receiver is off hook. It will be understood that the normal substation elements, i.e., receiver, transmitter, dial and so on, are provided in the telephone set. It will also be understood that the various elements of the system not described in detail subsequently are of the general form and perform in a generally similar manner to that previously described in the art and now well known. For example, the operation and arrangement of the line and cut-off relays in telephone systems of the general nature illustrated are well understood and will be referred to herein only to the extent necessary to properly disclose the novel arrangements contemplated by the invention. As shown, the tip and ring conductors of the line are connected to switching network 18 which is common to a group of lines including that illustrated. Common control circuit 19 controls the operation of switching network 18, this control being represented symbolically by dotted lead 20. Time-out circuit 21 is a circuit which detects the condition resulting when a telephone set is off hook and when no dial pulses have been received for a predetermined interval after the set first went off hook. The interval referred to it determined by common timing circuit 22. At the expiration of the interval, time-out circuit 21 notifies common control circuit 19 that the call should be processed as a permanent signal and common control circuit 19 responds by connecting operating battery to path 23.

While in the absence of an alarm condition, a battery-to-ground path is closed through the two windings of line relay L, the relay does not operate over this path due to the relatively high ohmage of resistor 13. The path referred to is traced from ground, upper winding of line relay L, break contact CO–1 of cut-off relay CO, break contact SH1–1 of relay SH1, alarm contact AL–1, bridge resistor 13, alarm contact AL–2, break contact CO–2 of cut-off relay CO, lower winding of line relay L, break contact SH–1 of relay SH, winding of detect relay DET, break contact SH–2 of relay SH, to battery. It will be noted that this is also a battery-to-ground path for the single winding relay DET, and this relay, having different characteristics than relay L, operates, and is held operated, over the path traced.

*Legitimate Permanent Signal*

Since alarm indications are inherently a form of "permanent signals," a term well-known in communication parlance, it may be of interest at this point to consider the handling of a "legitimate" permanent signal by the illustrated system. The term "legitimate permanent signal" is intended to distinguish from alarm indications (also permanent signals of a type) and such signals commonly result from an accidental off-hook situation which, of course, causes a line closure which is not followed in due course by dial pulses. As is well known, permanent signals are "timed" by apparatus and circuits provided at the central office and, if they persist for a predetermined interval which may be, for example, of the order of from 20 to 40 seconds, they are routed to a permanent signal holding trunk circuit for subsequent action leading to ultimate clearing of the condition. The handling of permanent signals in crossbar systems, for example, is described in A. J. Busch Patent 2,585,904, February 19, 1952, and in an article "Permanent Signals in #5 Crossbar," by Joseph Michal, Bell Laboratories Record, October 1950, page 461, while an announcing circuit for use in connection with such systems is disclosed in the copending application of A. A. Mayer and T. D. Robb, Serial No. 161,905, filed December 26, 1961.

Let us assume now that switchhook 17 is closed through accidental displacement of the handset and remains in that condition. Line relay L will now operate over the relatively low resistance path traced from ground, upper winding of relay L, break contact CO–1 of cut-off relay CO, break contact SH1–1 of relay SH1, alarm contact AL–1, closed loop at substation through switchhook 17, alarm contact AL–2, break contact CO–2 of relay CO, lower winding of relay L, break contact SH–1 of relay SH, winding of detect relay DET, break contact SH–2 of relay SH to battery.

The tip and ring closure at the telephone set appears to the central office line finder and subsequent switching equipment as an ordinary customer request for service, switching network 18 is activated to service the call under control of common control 19, and the cut-off relay CO operates following operation of the line relay in the normal manner. After a predetermined interval as determined by common timing circuit 22, and which may be, for example, of the order of from 20 to 40 seconds, time-out circuit 21, operating in the normal manner, will pass a permanent signal indication to common control 19 causing the common control circuit in turn to connect battery to lead 23. Permanent signal relay PS now operates over an obvious path which includes make contact MON–1 of the normally operated relay MON. Relay PS, operated, completes at its make contacts PS–1 and PS–2 a path for connection of the "call" to permanent signal holding trunk circuit 24 for further processing. (Since various methods of detecting and processing permanent signal indications are well known in the art and since the particular specific method utilized in the present instance is not controlling with respect to the invention, undue amplification and complication of the disclosure is being avoided by omitting a detailed description of such elements as time-out circuit 21, common control circuit 19 and permanent signal holding trunk circuit 24.)

It will be noted that the alarm detecting equipment is, in effect, removed following operation of the cut-off relay (break contacts CO–1 and CO–2) and does not, therefore, interfere in any way with the above-described handling of a legitimate permanent signal. The cut-off relay when operated connects, as a part of its normal functions, ground to sleeve lead 25 and this ground holds relay DET operated through resistor 26 and break contacts SH–1 and SH–2 of relay SH.

*Alarm Indication*

Let us assume now that an alarm indication occurs and see in what way the handling of this type of "permanent signal" differs from that just described in the instance of a so-termed legitimate permanent signal. Assuming, therefore, that alarm contact AL–1 has operated and opened the line at that point, detect relay DET will now release since the previously traced battery-to-ground path, over which the relay was held, is open at the alarm contact. Release of relay DET is followed by operation of relay DET1, which has a slow-operate characteristic, over a path from battery, winding of relay DET1, break contact DET–1 of relay DET to ground. Relay DET1, operated, completes at its make contact DET1–1 an obvious operate path for relay SH which now operates. Operation of relay SH is followed in turn by operation of relay SH1 over an obvious operate path through make contacts SH–3 of relay SH.

Relay DET1, operated, completes through its DET1–2 make contact an alternate portion in the battery supply path to relay L, while relay SH, upon operating, interrupts at its SH–1 and SH–2 break contacts the battery path through the winding of relay DET and establishes through its SH–4 and SH–5 make contacts an alternate path through this winding which will be further referred to below.

The SH1 relay, upon operating, closes at its SH1–2 make contact a path for connecting bridge resistor 27 across tip 11 and ring 12 of the line. Resistor 27 is of relatively low ohmage as compared with that of resistor 13, for example of the order of 1000ω, and line relay L now operates over this path traced from battery, make contact DET1–2 of relay DET1, lower winding of relay L, break contact CO–2 of relay CO, resistor 27, make contact SH1–2 of relay SH1, break contact CO–1 of relay CO, upper winding of relay L to ground. Line relay L now operates, therefore, but it will be noted that this operation takes place only after all three sequentially operating alarm relays DET1, SH and SH1 have operated.

With the operation of line relay L and subsequent operation of the cut-off relay CO, the closed line condition again appears to the subsequent switching equipment at the central office as an ordinary customer request for service and switching network 18 is activated to service the call. As the line closure is not followed by dial pulses, this "call" will again be handled as a "permanent signal" but in this instance with important changes in circuit operation resulting from the novel arrangement contemplated by the invention.

The operation of control unit 41, monopulser 42, which includes relay MON, and the common timing circuit 22 will be described in detail subsequently with reference to FIG. 2, but will be described only in general terms at this point. It will be noted that upon operation of relay SH1 as above described, ground is applied over make contact SH1–3 thereof to control unit 41. In a manner which will be described in detail subsequently with reference to FIG. 2, control unit 41 upon connection of the ground just referred to is caused to actuate monopulser 42 at which time normally operated relay MON releases. In a manner which will also be described in detail subsequently, relay MON, released, changes the interval of common timing circuit 22 from its normal range of the order of from 20 to 40 seconds to a substantially shorter "alarm" interval of the order of from 5 to 10 seconds. Time-out circuit 21 operating as above described, but now with a reduced interval of from 5 to 10 seconds, will again pass a permanent signal indication to common control circuit 19 causing that circuit to connect battery to the relay operating path over line 23. In this instance, however, due to release of relay MON as above noted, relay PSA will be operated (break contact MON–2 of relay MON) rather than relay PS as before. The "alarm" permanent signal is therefore routed through make contacts PSA–1 and PSA–2 of relay PSA to alarm operator's position 43 for proper handling. Alarm operator's position 43 will preferably be provided with ringing control apparatus whereby, if desired, an alarm ringer at the protected premises can be rung as a local alarm by the operator applying ringing current to the ring conductor 12. Also, switches T–1 and T–2 may be provided at the premises for use in establishing a talking path between the alarm operator and the customer while the corresponding alarm switch, AL–1 or AL–2, is open. Closure of switch T–1 or T–2, or the return to normal of the alarm switch, will set up a path for reoperation of relay DET which, in turn, starts release of the alarm relays in the restoration sequence. The reoperating path utilizes the central office battery and ground which are applied to the tip and ring while the CO relay is operated, and is traced from tip 11, make contact SH–4 of relay SH, winding of relay DET, make contact SH–5 of relay SH, bridge resistor 13, ring 12 and back to the central office.

Briefly, therefore, the novel arrangement contemplated by the invention is such that alarm indications are handled with two important differences as compared with the handling of legitimate permanent signals. First, the "waiting interval" is automatically reduced by a substantial amount and, second, the "signal" is routed to an alarm operator's position rather than to the permanent signal holding trunk circuit.

Referring now particularly to FIG. 2, a more detailed description will be given of the operation of control unit 41, monopulser 42 and common timing circuit 22.

As previously pointed out above in reference to FIG. 1, ground applied to the control unit 41 through make contact SH1–3 of relay SH1 activates monopulser 42 and releases normally operated relay MON which, in turn, reduces the waiting interval of common timing circuit 22. The ground referred to is applied through make contact SH1–3 of relay SH1 and capacitor 2C1 to "set" lead 44 of the transistor flip-flop circuit, and though capacitor 2C2 to base electrode 47 of transistor 2Q2. This turns the circuit to "Set" or "ON" (transistor 2Q2 "OFF," or non-conductive, and transistor 2Q1 "ON," or conductive), and relay SET operates.

Relay SET, upon operating, closes at its make contact SET–1 a path for discharging capacitor 2C3 through resistor 2R5, and interrupts at its break contact SET–2 the holding path for relay MON previously traceable from battery, break contact SET–2 of relay SET, make contact MON–3 and winding of relay MON to ground. Relay MON releases as above mentioned. Also, relay SET, operated, applies ground through its SET–3 make contact to "Reset" lead 48 and through capacitor 2C5 to base electrode 51 of transistor 2Q1. This restores the flip-flop transistor circuit to "Reset" or "OFF" (transistor 2Q2 "ON," transistor 2Q1 "OFF") and relay SET now releases.

Upon release of relay SET and interruption of the discharge path at make contact SET-1, capacitor 2C3 starts to charge from battery through resistor 2R6. Capacitor 2C3 will continue to charge until a voltage is stored which equals the breakdown voltage point of diode 52. When this point is reached the capacitor will discharge through the winding of relay MON to ground whereby to operate the relay. Relay MON, upon operating, will lock up over a path from battery, break contact SET–2 of relay SET (now released), its own make contact MON–3 and winding to ground. The characteristics of resistor 2R6 and capacitor 2C3 are so established that the time required for charging the capacitor to the breakdown point of diode 52 is just equal to the desired released time of relay MON. This interval may be, for example, of the order of 10 seconds.

It was noted above that release of relay MON was effective to reduce the interval of common timing circuit 22. This circuit may be of a basic type well known in the art and includes as a major element gas-filled tube 53. When time-out circuit 21 (FIG. 1) requires the timing function of the timing circuit contact 50 (FIG. 2) is opened by relay operation or other suitable means and this removes the shunting path across capacitor 54. The capacitor now charges from 130 v. battery at a rate determined by the characteristics of resistor 58. It will be noted that resistor 57 is shunted at this time by the path through make contact MON–5 of relay MON. When the charge on capacitor 54 has reached the breakdown voltage of tube 53 (that is, at the end of the normal permanent signal interval, 20 to 40 seconds), the tube fires permitting conduction on the main gap. Relay CONT now operates on conduction through the main gap of tube 53 and through resistor 59, and upon operating locks up through its own make contact CONT–1 to ground. For purposes of our present description, operation of relay CONT is presumed to control time-out circuit 21 in its above-described action of passing a permanent signal indication to common control circuit 19.

Now when relay MON is released, the charging time of capacitor 54 will be determined by the characteristics of resistor 57 since the shunt path for that resistor is removed at make contact MON–5 while resistor 58 is now shunted by a path through break contact MON–4. The characteristics of resistor 57 are so established that the charging interval of capacitor 54 will now be reduced to an interval of the order of from 5 to 10 seconds.

It will be understood, of course, that upon reoperation of relay MON at the end of the predetermined interval, common timing circuit 22 restores to its normal permanent signal interval and the operating path 23 from the common control 19 is disconnected from relay PSA and reconnected to relay PS.

While, for purposes of simplification, the alarm indicating facilities have been illustrated as serving one customer line alone, it will be understood that in actual practice a plurality of lines will preferably be served. The control unit 41, for example, will be provided with a plurality of parallel input leads each with a control contact corresponding to contact SH1–3. Also, the alarm operator's position 43 will be provided with display apparatus or other suitable apparatus for appraising the alarm operator of the directory number of the line currently indicating an alarm condition.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a subscriber's station, a central office, a telephone set provided with pulsing means at said subscriber's station, a first path and a second path at said central office, means effective upon closure of the line loop through said telephone set for establishing a connection between said subscriber's station and said central office, means effective upon said closed loop remaining uninterrupted by said pulsing means for a waiting interval of a predetermined, definite extent for routing the connection to said first path, means at said subscriber's station for indicating an abnormal alarm condition, means effective upon operation of said indicating means for reducing the extent of the waiting interval, and means effective during the reduced waiting interval for routing the alarm condition indication to said second path.

2. In a telephone system, a subscriber's station, a central office, a telephone set provided with pulsing means at said subscriber's station, an alarm operator's position and a permanent signal holding trunk circuit at said central office, means effective upon closure of the line loop through said telephone set for establishing a connection between said subscriber's station and said central office, means effective upon said closed loop remaining uninterrupted by said pulsing means for a waiting interval of a predetermined, definite extent for routing the connection to said permanent signal holding trunk circuit, means at said subscriber's station for indicating an abnormal alarm condition, means effective upon operation of said indicating means for reducing the extent of the waiting interval, and means effective during the reduced waiting interval for forwarding the alarm condition indication to said alarm operator's position.

3. In a telephone system, a subscriber's station, a central office, a line between said subscriber's station and said central office, a telephone set provided with pulsing means at said subscriber's station, an alarm operator's position, a normally open first path at said central office between said line and said alarm operator's position, a permanent signal holding trunk circuit, a normally open second path at said central office between said line and said permanent signal holding trunk circuit, means effective upon closure of the line loop through said telephone set for establishing a connection between said subscriber's station and said central office over said line, means effective upon said closed loop remaining uninterrupted by said pulsing means for a waiting interval of a predetermined definite extent for closing said second path whereby to connect said line to said permanent signal holding trunk circuit, means at said subscriber's station for indicating an abnormal alarm condition, means effective upon operation of said indicating means for reducing the extent of the waiting interval, and means effective during the reduced waiting interval for closing said first path whereby to connect said line to said alarm operator's position.

4. In a telephone system, the combination defined by claim 3 further characterized in that said alarm condition indicating means includes a relatively high resistance shunt connected across said line at said subscriber's station and means effective upon operation of said indicating means for removing said shunt connection.

5. In a telephone system, a subscriber's station, a central office, a line between said subscriber's station and said central office, a telephone set provided with pulsing means at said subscriber's station, an alarm operator's position, a normally open first path at said central office between said line and said alarm operator's position, a permanent signal holding trunk circuit, a normally open second path at said central office between said line and said permanent signal holding trunk circuit, means effective upon closure of the line loop through said telephone set for establishing a connection between said subscriber's station and said central office over said line, means effective upon said closed loop remaining uninterrupted by said pulsing means for a waiting interval of a predetermined definite extent for closing said second path whereby to connect said line to said permanent signal holding trunk circuit, a relatively high resistance shunt connected across said line at said subscriber's station, a relay at said central office, means for holding said relay operated over a third path which includes said shunt and portions of said line, means effective upon occurrence of an alarm condition at said subscriber's station for interrupting said third path at said shunt whereby to release said relay, means effective upon release of said relay for reducing the extent of the waiting interval, and means effective during the reduced waiting interval for closing said first path whereby to connect said line to said alarm operator's position.

6. In a telephone system, a subscriber's station, a central office, a line between said subscriber's station and said central office, a telephone set provided with pulsing means at said subscriber's station, an alarm operator's position, a normally open first path at said central office between said line and said alarm operator's position, a permanent signal holding trunk circuit, a normally open second path at said central office between said line and said permanent signal holding trunk circuit, means effective upon closure of the line loop through said telephone set for establishing a connection between said subscriber's station and said central office over said line, means effective upon said closed loop remaining uninterrupted by said pulsing means for a waiting interval of a predetermined definite extent for closing said second path whereby to connect said line to said permanent signal holding trunk circuit, a relatively high resistance shunt connected across said line at said subscriber's station, a relay at said central office, means for holding said relay operated over a third path which includes said shunt and portions of said line, means effective upon occurrence of an alarm condition at said subscriber's station for interrupting said third path at said shunt whereby to release said relay, a second, a third and a fourth relay at said central office, means effective upon release of said first-mentioned relay for operating said second, said third and said fourth relays in sequence, means effective upon operation of said fourth relay for reducing the extent of the waiting interval, and means effective during the reduced waiting interval for closing said first path whereby to connect said line to said alarm operator's position.

7. In a telephone system, the combination defined by claim 6 further characterized in additional means at the subscriber's station for restoring said third path at said shunt whereby to reoperate said first-mentioned relay.

8. In a telephone system, a subscriber's station, a central office, a line between said subscriber's station and said central office, a telephone set provided with pulsing means at said subscriber's station, an alarm operator's position, a normally open first path at said central office between said line and said alarm operator's position, a permanent signal holding trunk circuit, a normally open second path at said central office between said line and said permanent signal holding trunk circuit, means effective upon closure of the line loop through said telephone set for establishing a connection between said subscriber's station and said central office over said line, means effective upon said closed loop remaining uninterrupted by said pulsing means for a first waiting interval of a normal predetermined definite extent for closing said second path whereby to connect said line to said permanent signal holding trunk circuit, means at said subscriber's station for indicating an abnormal alarm condition, means effective upon operation of said indicating means for reducing the extent of the waiting interval, means effective during the reduced waiting interval for closing said first path whereby to connect said line to said alarm operator's position, and means effective after a second waiting interval of a predetermined definite extent for restoring the extent of said first waiting interval to normal.

9. In a telephone system, the combination defined by claim 8 further characterized in means for measuring the extent of said second waiting interval.

10. In a telephone system, the combination defined by claim 9 further characterized in that said last-mentioned means includes a normally operated relay, means for releasing said relay and means for reoperating said relay after a predetermined definite interval of extent corresponding to the extent of said second waiting interval.

11. In a telephone system, the combination defined by claim 10 further characterized in that said reoperating means includes a capacitor, a charging path and a discharging path for said capacitor and a voltage breakdown device in said discharging path.

No references cited.